United States Patent [19]

Hendrickson et al.

[11] Patent Number: 5,601,214
[45] Date of Patent: Feb. 11, 1997

[54] PLASTIC CONTAINER HAVING AN INJECTION MOLDED FINISH WITH AN INTEGRAL CLOSURE ATTACHED THERETO

[75] Inventors: Ralph B. Hendrickson, Temperance, Mich.; Carl E. Koeniger, Toledo, Ohio

[73] Assignee: Owens-Brockway Plastic Products Inc., Toledo, Ohio

[21] Appl. No.: 400,736

[22] Filed: Mar. 8, 1995

[51] Int. Cl.[6] ................................................. B67D 3/00
[52] U.S. Cl. .................... 222/517; 222/541.6; 222/556; 222/563
[58] Field of Search ................... 222/517, 541.1, 222/541.6, 546, 556, 563

[56] References Cited

U.S. PATENT DOCUMENTS

| | | | |
|---|---|---|---|
| 2,710,987 | 6/1955 | Sherman | 18/5 |
| 2,778,533 | 1/1957 | Savary | 222/92 |
| 2,911,673 | 11/1959 | Soubier | 18/5 |
| 2,936,481 | 3/1960 | Wilkalis et al. | 18/5 |
| 3,086,249 | 4/1963 | Nelson et al. | 264/537 X |
| 3,115,682 | 12/1963 | Soubier et al. | 264/539 X |
| 3,398,427 | 8/1968 | John | 425/525 X |
| 3,933,271 | 1/1976 | McGhie | 222/556 |
| 4,310,105 | 1/1982 | Gach | 222/556 X |
| 5,008,066 | 4/1991 | Mueller | 264/537 |
| 5,213,860 | 5/1993 | Laing | 222/541.6 X |
| 5,238,157 | 8/1993 | Gentile | 222/541.6 X |

FOREIGN PATENT DOCUMENTS

| | | | |
|---|---|---|---|
| 1965761 | 7/1970 | Germany | 222/541.6 |
| 3516890 | 11/1986 | Germany | 222/556 |
| 9200228 | 1/1992 | WIPO | 222/556 |

*Primary Examiner*—Joseph Kaufman

[57] ABSTRACT

The plastic container and body including a body portion, a neck defining a finish and having an opening therein and a closure connected to the end of the neck by a strap. The strap is formed with a weakened line such as to define a integral hinge about which the closure is folded after filling the container with the contents in order to bring a plug portion of the closure into engagement with the opening of the finish.

8 Claims, 4 Drawing Sheets

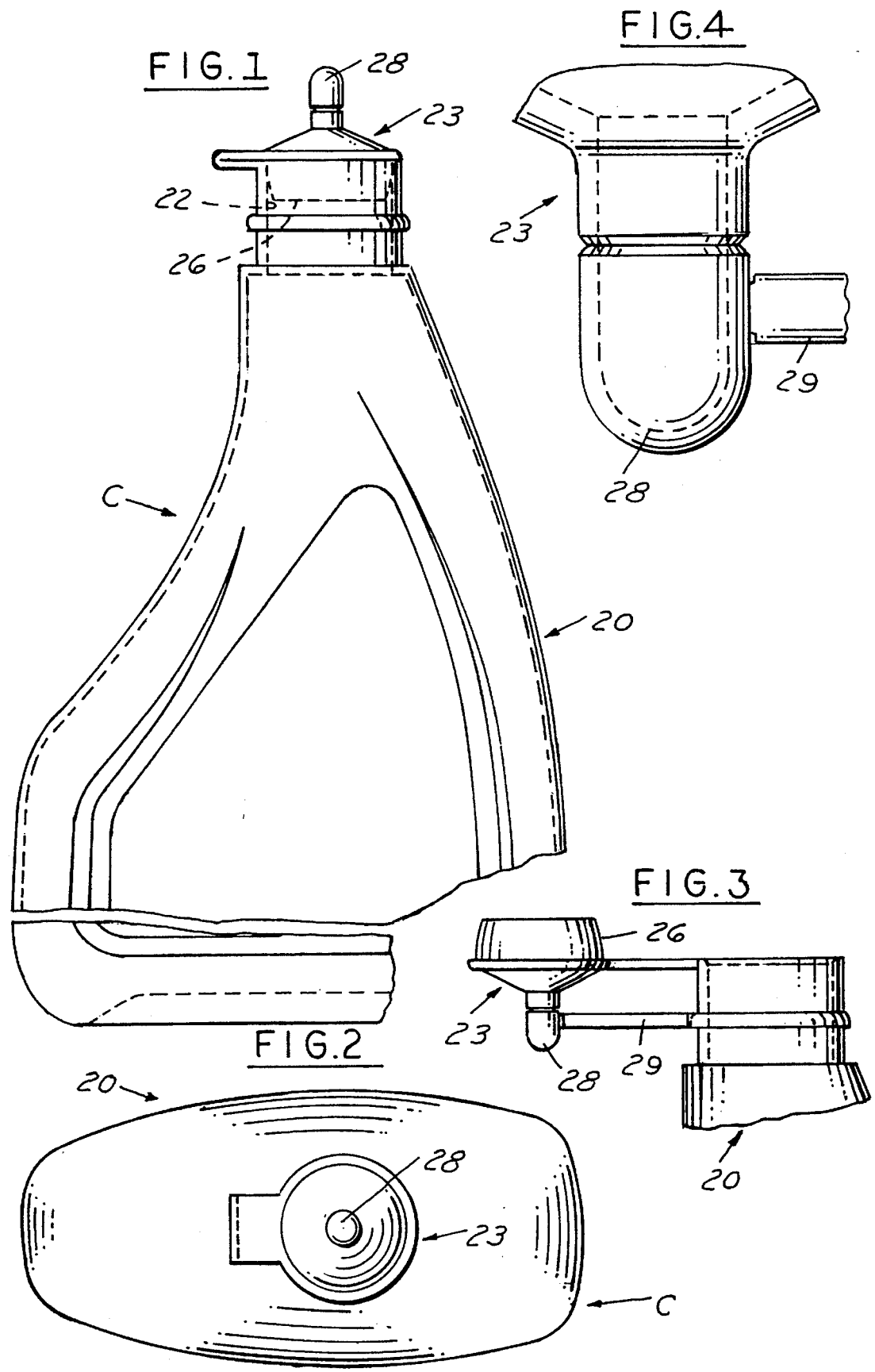

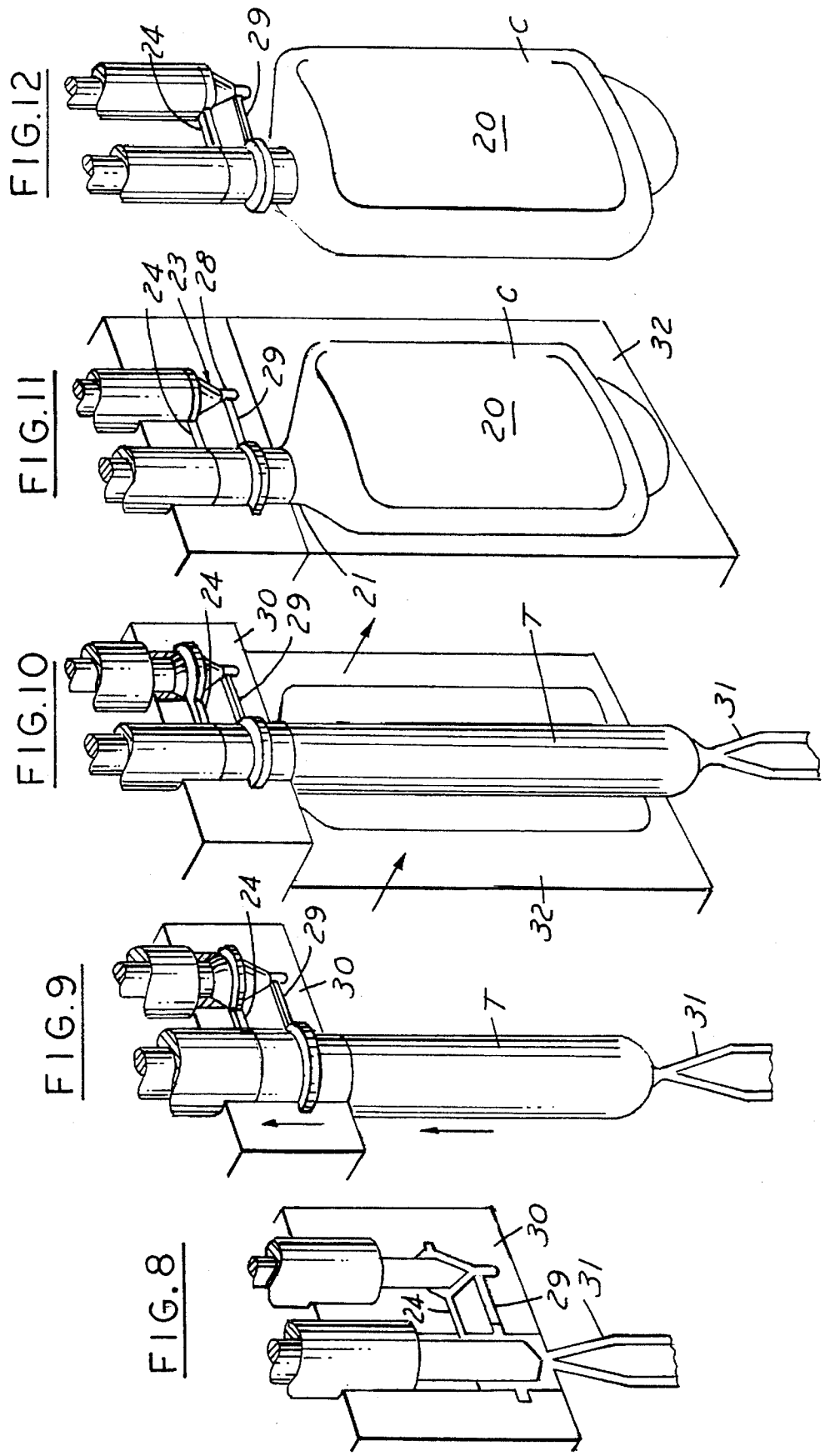

PLASTIC CONTAINER HAVING AN INJECTION MOLDED FINISH WITH AN INTEGRAL CLOSURE ATTACHED THERETO

This invention relates to plastic containers and plastic containers which have an integral closure attached thereto.

BACKGROUND AND SUMMARY OF THE INVENTION

In one type of plastic container it is common to make the plastic container by injection molding a finish, extruding an integral plastic tube attached to the finish, closing molds about the container and blowing the container to the confines of the mold to form the container. Such a method is shown, for example, in U.S. Pat. Nos. 2,710,987, and 2,911,673 and 2,936,481.

In such a container, if a closure is to be applied it is necessary for special closure tooling to be used; have a bottle and closure inventory; and require the customer to handle separate parts. In addition, where the closure and container are made of separate plastics, the closures and containers may need to be separated in order to recycle the plastic.

It has heretofore been suggested to provide an integral closure such as in U.S. Pat. Nos. 3,086,249, 3,115,682 and 5,008,006.

Among the objectives of the present invention are to provide a plastic container having an injected finish and closure with an extruded and blown body portion; wherein the closure is connected to the finish of the container by a hinge strap; wherein the closure includes a plug portion such that when the strap is folded about the hinge, which is formed integrally, the plug portion of the closure is centered over and can be readily pressed into the finish for sealing.

In accordance with the invention, the plastic container and body includes a body portion, a neck defining a finish and having an opening therein and a closure connected to the end of the neck by a strap. The strap is formed with a weakened line such as to define an integral hinge about which the closure is folded after filling the container with the contents in order as to bring a plug portion of the closure into engagement with the opening of the finish.

DESCRIPTION OF THE DRAWINGS

FIG. 1 is a fragmentary elevational view of a container and closure embodying the invention.

FIG. 2 is a plan view of the same.

FIG. 3 is a fragmentary elevational view showing the upper end of the container and closure as molded.

FIG. 4 is fragmentary enlarged view of a portion of the closure as molded.

FIGS. 8–12 are fragmentary schismatic views showing the manner in which the closure is made during successive steps of making.

DESCRIPTION OF THE PREFERRED EMBODIMENTS

Figure 5:
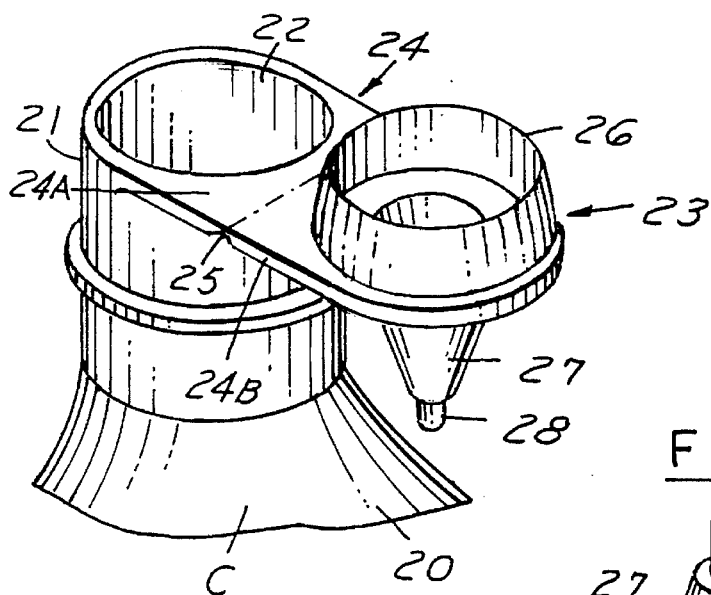
FIG. 5 is a fragmentary perspective view of the upper end of the container and closure after molding and trimming.

Referring to FIGS. 1–7 the plastic container embodying the invention comprises a hollow body 20, formed with a neck 21, defining a finish having an opening 22 to which a closure 23 is connected by an integral strap 24. The strap 24 includes a groove 25 (FIG. 5) which defines an integral hinge separating the strap into a first portion 24A connected to the upper end of the finish 21 and a second portion 24B connected to the closure 23. The closure includes a plug portion 26 that is adapted to enter the opening 22 of the finish. The closure 23 further includes a dispensing spout 27 that is closed by small integrally molded tubular plug 28 that has a closed end.

Figure 6:
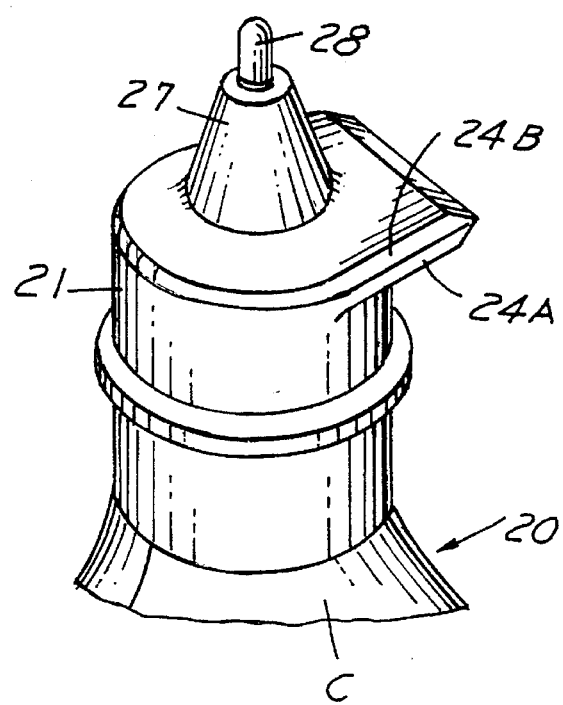
FIG. 6 is a fragmentary perspective view showing the upper end of the container and closure, when the closure is in sealing position.
Figure 7:
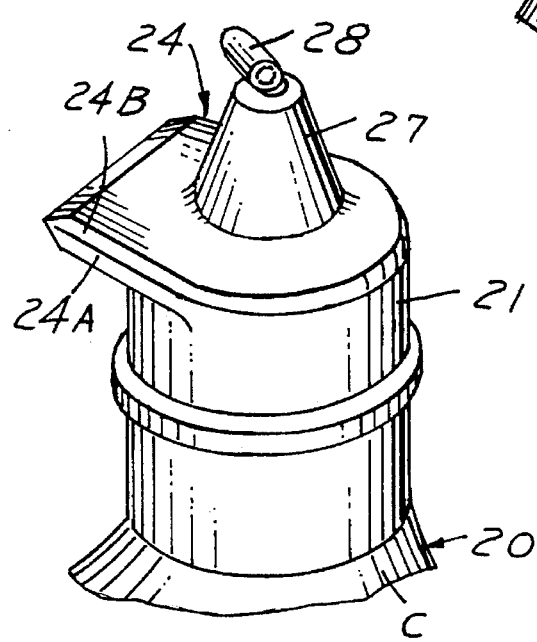
FIG. 7 is a fragmentary perspective view showing how the end of the closure can be severed to provide a dispensing opening.
Figure 13:
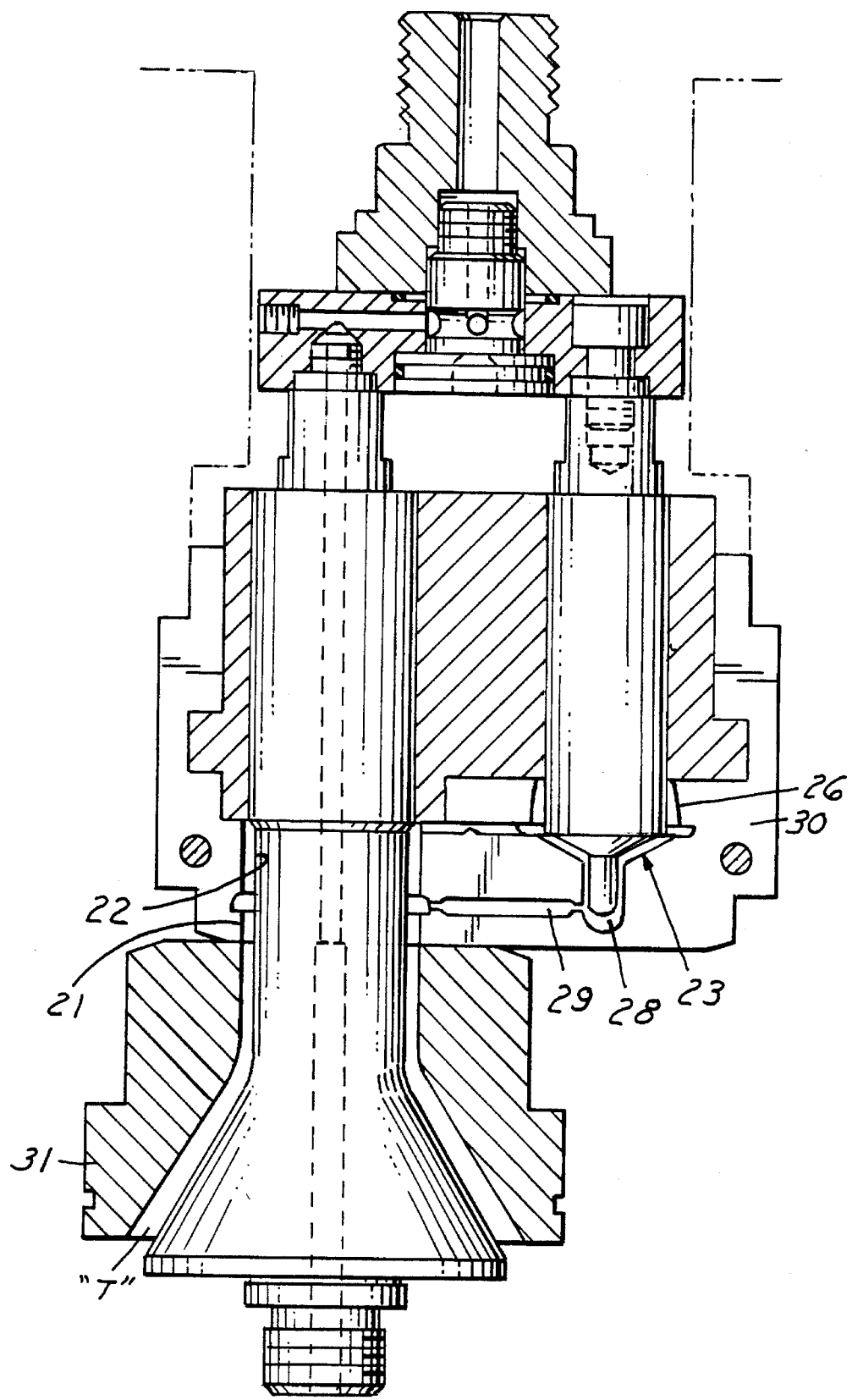
FIG. 13 is a fragmentary sectional view of a portion of an apparatus for making the closure.

When the container is filled, the closure is folded about the weakened line 25 bringing the plug 26 into centered registry with the opening 22 so that the strap 24 can be folded and the closure forced downwardly, by machinery or by hand, to bring the portions 24A, 24B of the strap into engagement (FIG. 6). When it is desired to dispense the contents, the closed projection 28 can be severed by an instrument or by hand leaving an opening for dispensing the contents.

The container is preferably made by a process known as an injection, extrude and blow process that is commonly known as the BC-3 process, such as shown in the aforementioned U.S. Pat. Nos. 2,710,987, 2,911,673 and 2,936,481, incorporated herein by reference.

In such an arrangement, as shown in FIGS. 8–13, neck ring halves 30 are brought together adjacent an extruder 31 to injection mold the molten plastic into the neck, closure, and integral strap cavity formed by closing of the neck rings. The neck rings 30 are then moved axially relatively to the extruder 31 to extrude a tube T. Blow molds 32 are then closed about the tube while the neck rings 30 are closed and air is introduced through the neck to blow the hollow body C forming the container 20. During this molding process, a second strap or runner 29 is formed that extends from the finish 21 at a point axially spaced from the upper open end of the finish to the closure 23 and in the instance shown to the integral cap 28 (FIG. 3). The provision of the auxiliary strap 29 aids in filling of the closure cavity 23 during the injection portion of the process. This closure strap 29 also stabilizes the position of the closure 23 during the filling of the container after which the strap 29 can be trimmed from the container leaving the closure in position for folding and closing of the opening of the finish.

It can thus be seen that there has been provided a plastic container having an injected finish and closure with an extruded and blown body portion; wherein the closure is connected to the finish of the container by hinge strap; wherein the closure includes a plug portion such that when the strap is folded about the hinge, that is formed integrally, the closure is centered over and can be readily pressed into the finish for sealing.

What is claimed is:

1. A plastic container comprising a plastic hollow body portion, and integral finish having an end forming an opening, a plastic closure, said plastic closure including an integral plug portion adapted to extend into the opening of the finish, and integral strap connecting the closure to the upper end of the finish adjacent the opening, said strap lying in a single plan integral with said finish adjacent said opening in said finish, said strap having a weakened line positioned such as to define an integral hinge dividing said strap into two flat strap portions, one said strap portion being integral to said finish and the other said flat portion having a free end, the other said flat portion including the integral plug portion, such that when the other said flat portion is folded, said plug portion is brought into alignment with the opening in the finish; wherein said closure further includes a spout extending axially away from the plug portion and the spout further including an integrally molded sealing plug that is severable to provide for dispensing the contents through an opening in the spout.

2. The plastic container and integral closure set forth in claim 1 wherein said weakened line comprises a groove in the underside of said integral strap dividing the strap into said two flat strap portions whereby when the closure is folded, the strap is folded about the weakened line defining the hinge bringing the plug portion of the closure into said opening in the finish.

3. The plastic container and integral closure set forth in claim 2 wherein said finish is injection molded.

4. A plastic container comprising a plastic body portion, and integral finish having an end forming an opening, a plastic closure, said plastic closure including an integral plug portion adapted to extend into the opening of the finish, and integral strap connecting the closure to the upper end of the finish adjacent the opening, said strap lying in a single plane integral with said finish adjacent said opening in said finish, said strap including a weakened line positioned such that to define an integral hinge dividing said strap into two flat strap portions, one said strap portion being integral to said finish and the other said flat portion having a free end, the other said flat portion including the integral plug portion, such that when the other said flat portion is folded, said plug portion is brought into alignment with the opening in the finish, a second flat strap lying in a second plane parallel to said first mentioned plane extending from the closure to the finish aids in filling the mold cavity during making of the container and closure and stabilizes the closure during filling of said closure during injection of the finish and blowing of the container.

5. The plastic container and integral closure set forth in claim 4 wherein said weakened line comprises a groove in the underside of said integral strap dividing the strap into said two flat strap portions whereby when the closure is folded, the strap is folded about the weakened line defining the hinge bringing the plug portion of the closure said opening in the finish.

6. The plastic container and integral closure set forth in claim 5 wherein said finish is injection molded.

7. The plastic container and integral closure set forth claim 6, wherein said closure includes a spout extending axially away from the plug portion.

8. The plastic container and integral closure set forth in claim 7 including an integrally molded sealing plug that is severable to provide for dispensing the contents through an opening in the spout.

* * * * *